Nov. 30, 1954     E. F. WHITE     2,695,666
APPARATUS FOR TRIMMING THE PERIPHERAL PORTIONS OF DISKS
Filed May 15, 1951
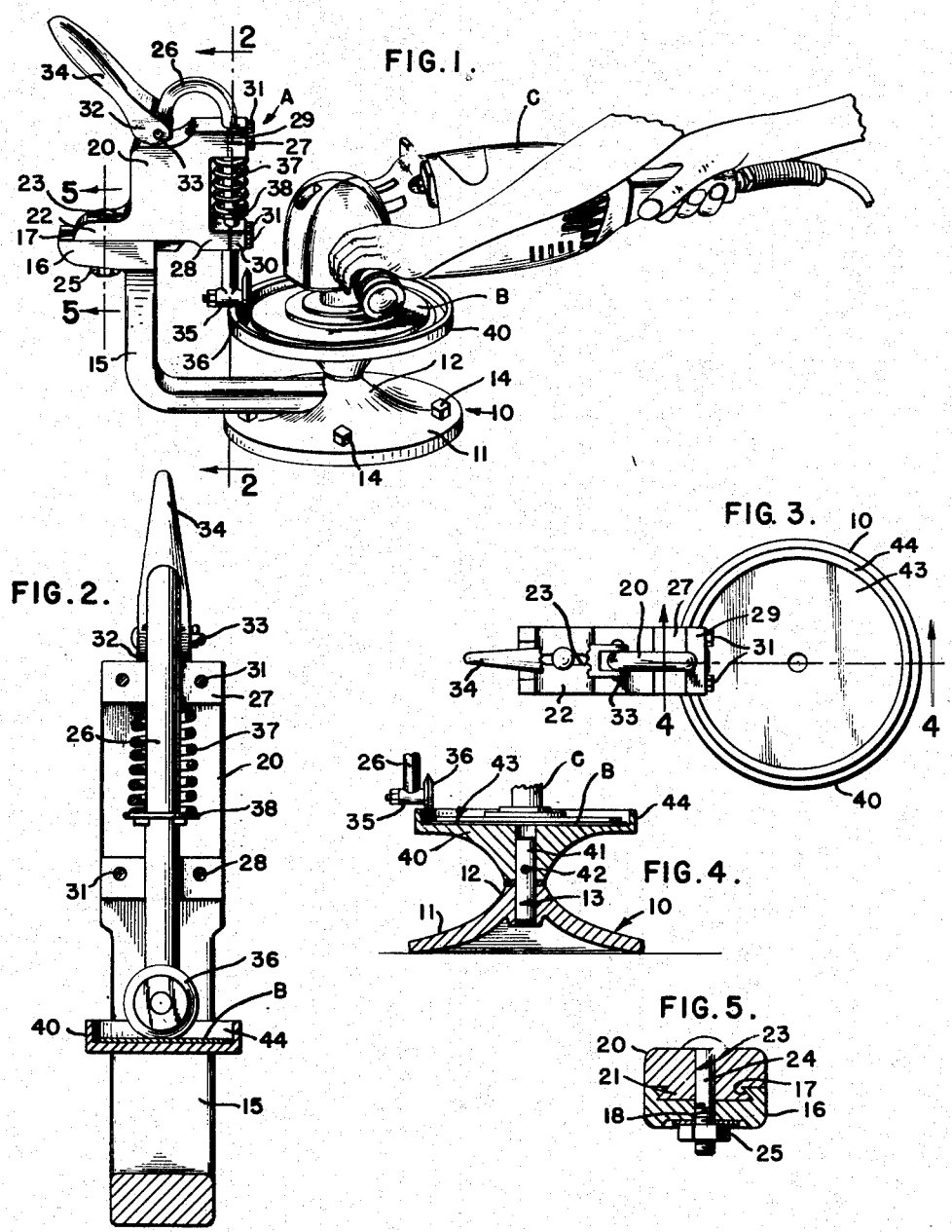
Inventor
EDWARD F. WHITE

2,695,666

APPARATUS FOR TRIMMING THE PERIPHERAL PORTIONS OF DISKS

Edward Frank White, Winston Salem, N. C.

Application May 15, 1951, Serial No. 226,340

1 Claim. (Cl. 164—63)

This invention relates to machines for cutting sheet material and more specifically to a machine for trimming the edge portion of a disc of suitable material. An example of such a disc is a rotatable auto sander disc.

An important object of the invention is to provide a trimmer which is operated by the machine which normally carries and rotates the disc when the latter is being employed, and which trimmer will cut or trim off the ragged edge portion of the disc without removing it from the machine.

Another important object is to provide a trimmer as described which may be adjusted in order to trim discs of various diameters.

A further important object is to provide a trimmer of the kind described which permits the operator to view the trimming operation while it is in progress, since the cutter is always in sight of the operator.

Other objects and advantages of the invention will be apparent during the course of the following detailed description of the invention, taken in connection with the accompanying drawing, forming a part of this disclosure, and in which drawing:

Figure 1 is a perspective view of the new machine in use and associated with a rotatable disc and machine.

Figure 2 is a vertical section thereof, substantially on the line 2—2 of Figure 1.

Figure 3 is a top plan of the machine of Figures 1 and 2.

Figure 4 is a vertical section of the same, substantially on the line 4—4 of Figure 3 but with the rotatable disc and machine of Figure 1 shown in part.

Figure 5 is a vertical section, substantially on the line 5—5 of Figure 1.

In the drawing, wherein for the purpose of illustration is shown a preferred embodiment of the invention and wherein similar reference characters designate corresponding parts throughout the several views, the letter A designates the new trimmer; B, a member being trimmed thereby; and C, means for rotating the member B when the latter is in frictional contact with a rotatable portion of the machine A, and, consequently rotates that portion.

The machine A includes a base 10 which may be a disc 11 having a truncated conical central portion 12 provided with an upwardly opening socket or bearing 13. The disc 11 may carry means 14 to secure it to a suitable support (not shown) such as the walls of openings to accommodate bolt or screw shanks extending into the support. From the portion 12 a substantially L-shaped arm 15 extends outwardly and upwardly and supports, at its upper end, a slideway 16 having an upwardly opening dovetailed slot 17 with its longitudinal axis extending toward the axis of the socket 13. The slideway 16 has a vertically-extending opening or bore 18 from its lower face to the center of the slot 17 to receive the shank of an adjusting means and retaining means illustrated in Fig. 5, and to be subsequently described.

The slideway 16 slidably supports a head 20 having a lower face and from the rearmost portion thereof there projects downwardly a complementary dovetail 21 for the slot 16. The head 20 above the dovetail 21 terminates in a flange 22 having a slot 23 paralleling the slot 17 and through this slot 23 and the opening or bore 18 projects the shank 24 of an adjusting bolt, carrying a nut 25 which provide means for adjustably retaining the head 20 with respect to the slideway 16. Thus, the head 20 may be slid back and forth for positioning the cutter (to be subsequently described) nearer to or farther from the axis of the socket 13.

This head 20 slidably supports a disc cutter carrier or J-shaped arm 26 with the straight portion of the arm 26 slidable in two spaced-apart bearings formed by forwardly-extending and paralleling projections 27 and 28 from the head 20 and complementary blocks 29 and 30, each projection and block having a groove to accommodate one-half of the diameter of the arm 26 and the blocks 29 may be secured to the projections as by screws 31.

The curved upper portion of the arm 26 is pivoted at its free end to the lower end of a cam member 32, as by a pivot pin 33, with the cam face of the member 32 bearing against the upper face of the head 20. By moving the handle 34 of the cam member 32 to the left as in Fig. 1 the arm 26 will be raised, and in the position shown in Fig. 1 the arm 26 is lowered. It should be noted that neither the cam member 32 nor the J-shaped arm is fixedly secured to the head. The cam member 32 simply rests upon the head.

Carried by the other or lower free end of the arm 26 is a bearing 35 with its bore extending toward the axis of the socket 13 which bearing carries a suitable cutter, preferably in the nature of a cutter disc 36 at its forward end.

About that portion of the arm 26 between the two projections 27 and 28 and blocks 29 and 30 is an expansion spiral spring 37 with its upper end bearing against the projection 27 and block 29 and its lower end bearing on an abutment (as a washer) 38 fixedly carried by the arm 26 and spaced above the projection 28.

The base 10 rotatably supports a turntable 40 mounted upon a shaft 41 secured thereto as by a pin 42 and with the lower end of the shaft rotatable within the socket 13. The turntable has, of course, a substantially flat work-receiving upper surface or face 43 bordered by an upwardly-extending peripheral flange 44. Obviously, a turntable having a diameter larger than that illustrated may be substituted in order to accommodate members B of larger diameter.

The cutter disc 36 is disposed with its lower edge slightly inwardly of the flange 44 and very closely adjacent the face 43.

A member B is illustrated as a sanding disc and rotatably carried by the manually-supported sanding machine C.

By pressing down on the arm 34 the cutter disc 36 will rise and provide clearance to insert the member B carried by the machine C. Release upon the arm 34 will cause the spring to advance the arm 26 so that the cutter will make an initial cut in the member B. Upon placing the machine in operation and bearing slightly upon the turntable with the disc, the former will rotate with the disc and the edge portion of the member B will be cut away. In the event a different turntable is to be substituted, the operator may hook his finger under the curved portion of the arm 26 and draw upwardly to raise the cutter sufficiently to substitute the turntable.

From the above, it will be seen that the member B need not be removed from the machine C for trimming, that the machine C supplies the traction for rotating the turntable 40 and that by moving the head 20 toward or away from the axis of the socket 13, the diameter of the trimmed member B may be varied as desired.

Various changes may be made to the form of the invention herein shown and described without departing from the spirit of the invention or scope of the claim.

What is claimed is:

In combination with a hand-held machine having a rotating rotor and a sanding disc carried by said rotor and said disc having an exposed sanded lower face and a peripheral portion, apparatus for trimming said peripheral portion while said disc is carried and rotated by said machine, said apparatus including a base; a turntable rotatably carried by the base and provided with a wholly flat upper face for frictional and removable engagement with said face of said disc; a cutter having a cutting edge; and means operatively carried by said base for moving said cutting edge selectively into and out of the path of rotation of the peripheral portion of said disc when said sanded lower face of said disc is held in firm contact with said flat upper face of said turntable by said hand-held machine.

(References on following page)

References Cited in the file of this patent

UNITED STATES PATENTS

| Number | Name | Date |
|---|---|---|
| 976,388 | Meyer | Nov. 22, 1910 |
| 1,821,611 | Bonsieur | Sept. 1, 1931 |
| 1,828,829 | Brown | Oct. 27, 1931 |
| 2,123,222 | Albertson | July 12, 1938 |
| 2,250,765 | Johnson | July 29, 1941 |
| 2,584,479 | MacDonald | Feb. 5, 1952 |

FOREIGN PATENTS

| Number | Country | Date |
|---|---|---|
| 116,525 | Germany | Jan. 7, 1901 |